United States Patent Office 3,355,433
Patented Nov. 28, 1967

3,355,433
MANGANESE PENTACARBONYL COMPOUNDS AS CATALYSTS IN THE PREPARATION OF POLYESTERS
Yuzi Okuzumi, Cuyahoga Falls, Ohio, assignor to The Goodyear Tire & Rubber Company, Akron, Ohio, a corporation of Ohio
No Drawing. Filed Mar. 2, 1964, Ser. No. 348,781
9 Claims. (Cl. 260—75)

This invention relates to the preparation of glycol esters of polycarboxylic acids. More particularly, this invention relates to new catalysts for the reactions used in preparing glycol esters by the alcoholysis of esters of dicarboxylic acid with a glycol.

Various materials have been proposed as catalysts for the ester interchange reaction between esters of dicarboxylic acids and glycol. Metals in the form of powder, chips, ribbon or wire have been suggested as well as catalysts having a large surface area such as powdered glass or silica gel. The more successful of the catalysts used in the past have been materials such as alkali metal and alkaline earth metal alcoholates, the alkali metal carbonates and litharge.

According to the present invention, manganese carbonyl compounds catalyze the ester interchange between glycols and esters of polycarboxylic acids. The glycol esters formed may be used to produce high molecular weight linear super polyesters of improved color.

The catalysts of the invention are manganese compounds selected from the group consisting of manganese pentacarbonyl and manganese compounds having the formula $RMn(CO)_5$ in which R is a radical selected from the group consisting of halogen, alkyl, cycloalkyl, alkenyl, cycloalkenyl, alkaryl, aryl and aralkyl radicals. For example, R can be halogen such as chlorine, bromine and iodine; alkyl radicals such as methyl, ethyl, propyl, butyl, amyl and hexyl; cycloalkyl radicals such as cyclohexenyl, and cycloheptenyl; alkaryl radicals such as methyl phenyl and ethyl phenyl; aryl radicals such as phenyl, diphenyl and naphthyl; aralkyl radicals such as benzyl and phenethyl. Representative examples of such compounds are methyl manganese pentacarbonyl, ethyl manganese pentacarbonyl, propylmanganese pentacarbonyl, butylmanganese pentacarbonyl, hexylmanganese pentacarbonyl, cyclopentylmanganese carbonyl, cyclohexylmanganese pentacarbonyl, cycloheptylmanganese pentacarbonyl, allylmanganese pentacarbonyl, crotonylmanganese pentacarbonyl, cyclohexenylmanganese pentacarbonyl, cycloheptenylmanganese pentacarbonyl, methylphenylmanganese pentacarbonyl, ethylphenylmanganese pentacarbonyl, phenylmanganese pentacarbonyl, diphenylmanganese pentacarbonyl, naphthylmanganese pentacarbonyl, benzylmanganese pentacarbonyl and phenethylmanganese pentacarbonyl. The following example illustrates the invention.

Example I

A glass reaction vessel in the shape of a tube approximately 35 cm. long having an inside diameter of 38 mm., equipped with a side arm and a nitrogen gas inlet tube and a stirrer was charged with 50 grams of dimethyl terephthalate, 40 ml. of ethylene glycol and 0.015 gram of manganese pentacarbonyl. The mixture was stirred and heated by means of a vapor bath having a temperature of about 240° C. for one hour while a slow stream of oxygen-free nitrogen gas was passed over the reaction mixture. The alcoholysis reaction was essentially complete at the end of this reaction time. Then an 0.03% by weight based on the dimethyl terephthalate of antimony dioxide catalyst was added to the reaction mixture and polymerization was carried out at 280° C. and 0.5 mm. of mercury pressure for two hours. The polyester formed had an intrinsic viscosity of 0.9.

The practice of the invention has been illustrated with particular respect to the preparation of the bis glycol ester of terephthalic acid and the preparation of polymeric ethylene terephthalate therefrom. Glycol esters of various other acids can similarly be made using the catalyst of the invention. The example also illustrated the invention particularly with respect to the use of the dimethyl esters of terephthalic acid and ethylene glycol. The catalysts of the invention are effective with other esters such as the ethyl, propyl, butyl and phenyl esters of the phthalic acids and other aromatic and aliphatic acids. Thus the invention is applicable to the manufacture of glycol esters of aromatic acids such as the phthalic acids, the naphthalene dicarboxylic acids, the diphenyl dicarboxylic acids, and aliphatic acids such as alpha, beta-diphenyl, ethane - 4,4' - dicarboxylic acid, alpha, delta - diphenyl butane 4,4'-dicarboxylic acid and of aliphatic acids such as oxalic acid, malonic acid, succinic acid, glutaric acid, adipic acid, sebacic acid, suberic acid, methyl succinic acid and alpha methyl adipic acid.

In the place of ethylene glycol other glycols can be used. Representative examples of other glycols are the propylene glycols, the butylene glycols, pentamethylene glycols, decamethylene glycols, alkyl substituted polymethylene glycols such as 2,2-dimethyl-1,3-propane, diethylene glycol and cyclohexanedimethanol. The phthalic acids and ethylene glycol are preferred because of their low cost and ready availability. Thus, in a preferred embodiment, ethylene glycol is reacted with a bis ester of at least one acid selected from the group consisting of terephthalic acid and isophthalic acid. The resulting glycol ester mixture can be polymerized to form high molecular weight linear copolyester in the presence of a suitable condensation catalyst.

The amount of the catalyst used may be varied over wide concentrations. As is usual in catalysts, the amount will be relatively small. As a general rule the amount will be within the range of from 0.003 to 1.0% based on the ester of polycarboxylic acid used. Generally from 0.005 to 0.10% based on the phthalate ester used gives a satisfactory reaction rate and a product of suitable color.

In the polymerization of the glycol esters the condensation reactions are in general carried out in accordance with the usual known techniques. Thus, the reactions are preferably carried out in the absence of oxygen, generally in an atmosphere of inert gas such as nitrogen or the like, in order to lessen darkening and to make it possible to prepare high molecular weight or colorless products. The polymerization or condensation reaction is carried out under reduced pressure, generally below 10 mm. of mercury pressure, and usually at or below 1 mm. of mercury pressure at a temperature in the range of 260 to 290° C.

The catalysts of the invention may be used as the sole catalyst for the ester interchange reaction or it can be used in combination with other catalysts if desired. Thus, the catalyst can be used with compounds such as zinc, lead, calcium, manganese, cadmium, titanium and antimony compounds particularly the oxides or salts of these metals with organic acids. Preferred catalysts are the zinc, lead, calcium, magnesium and cadmium salts. For the polymerization reaction litharge and antimony trioxide are suitable catalysts.

While certain representative embodiments and details have been shown for the purpose of illustrating the invention, it will be apparent to those skilled in this art that various changes and modifications may be made therein without departing from the spirit or scope of the invention.

What I claim is:
1. In a process for preparing a glycol ester of a di- carboxylic acid by subjecting at least one bis ester selected from the group consisting of methyl, ethyl, propyl, butyl and phenyl esters of the dicarboxylic acid to alcoholysis in the presence of an excess of a glycol, the improvement which comprises carrying out the alcoholysis reaction in the presence of a catalytic amount of a manganese pentacarbonyl compound.

2. The process of claim 1 in which the manganese carbonyl compound is selected from the group consisting of manganese pentacarbonyl and manganese compounds having the formula R—Mn(CO)$_5$ in which R is a radical selected from the group consisting of halogen, alkyl, cycloalkyl, alkenyl, cycloalkenyl, alkaryl, aryl and aralkyl radicals.

3. The process of claim 1 in which the manganese compound used is manganese pentacarbonyl.

4. The process of claim 1 in which the manganese compound is used together with another catalyst.

5. In a process for preparing a polymeric polyester by subjecting at least one bis ester of a dicarboxylic acid to alcoholysis in the presence of an excess of a glycol and thereafter subjecting the bis glycol ester formed to self-condensation with the removal of glycol, the improvement which comprises carrying out the alcoholysis and condensation reaction in the presence of a manganese pentacarbonyl compound.

6. The process of claim 1 in which the bis ester of the dicarboxylic acid is selected from bis esters of aromatic dicarboxylic acids and bis esters of aliphatic dicarboxylic acids.

7. The process of claim 6 in which the bis ester used is a bis ester of an aromatic dicarboxylic acid.

8. The process of claim 7 in which the bis ester used is dimethyl terephthalate.

9. The process of claim 5 in which the bis ester used is dimethyl terephthalate.

References Cited

UNITED STATES PATENTS

| | | | |
|---|---|---|---|
| 2,711,402 | 6/1955 | Fletcher | 260—75 |
| 2,822,348 | 2/1958 | Haslam | 260—75 |
| 2,857,363 | 10/1958 | Easley et al. | 260—75 |
| 3,933,475 | 4/1960 | Hoover et al. | 260—63 |

WILLIAM H. SHORT, *Primary Examiner.*

LOUISE P. QUAST, *Examiner.*